US006681619B2

United States Patent
Alleving et al.

(10) Patent No.: US 6,681,619 B2
(45) Date of Patent: Jan. 27, 2004

(54) SYSTEM FOR DETERMINING THE EFFECTIVENESS OF A CATALYTIC COATING ON A RADIATOR IN A MOTOR VEHICLE

(75) Inventors: Peter Alleving, Alingsas (SE); Anders Unger, Ravlanda (SE); Jan Skold, Alingsas (SE); Martin Petersson, Vastra Frolunda (SE); Erland Max, Vastra Frolunda (SE)

(73) Assignee: Volvo Car Corporation, Göteborg (SE)

( * ) Notice: Subject to any disclaimer, the term of this patent is extended or adjusted under 35 U.S.C. 154(b) by 97 days.

(21) Appl. No.: 09/681,623

(22) Filed: May 10, 2001

(65) Prior Publication Data

US 2001/0039928 A1 Nov. 15, 2001

(30) Foreign Application Priority Data

May 10, 2000 (SE) .............................................. 0001766

(51) Int. Cl.[7] ............................................. G01M 15/00
(52) U.S. Cl. ...................................................... 73/118.1
(58) Field of Search ............................... 75/116, 117.2, 75/117.3, 118.1, 118.2; 423/210; 436/37

(56) References Cited

U.S. PATENT DOCUMENTS

| 3,738,088 | A |   | 6/1973  | Colosimo |
|---|---|---|---|---|
| 4,733,605 | A |   | 3/1988  | Holter et al. |
| 5,655,364 | A |   | 8/1997  | Ma |
| 5,711,071 | A | * | 1/1998  | Fromson et al. |
| 5,732,549 | A |   | 3/1998  | Treinies et al. |
| 5,997,831 | A | * | 12/1999 | Dettling et al. |
| 6,190,627 | B1 | * | 2/2001  | Hoke et al. |
| 6,200,542 | B1 | * | 3/2001  | Poles et al. |
| 6,212,882 | B1 | * | 4/2001  | Greger et al. |
| 6,214,303 | B1 | * | 4/2001  | Hoke et al. |
| 6,506,605 | B1 | * | 1/2003  | Allen et al. ................... 436/37 |
| 2002/0000088 | A1 | * | 1/2002  | Alleving et al. .............. 60/277 |

FOREIGN PATENT DOCUMENTS

WO    WO 9622146 A2    7/1996

* cited by examiner

*Primary Examiner*—Eric S. McCall
(74) *Attorney, Agent, or Firm*—Howrey Simon Arnold & White LLP

(57) ABSTRACT

A system for determining the effectiveness of a catalytic coating on a radiator in a motor vehicle. The system provides a driver or maintenance staff status of the catalytic function provided by the catalytic coating on a heat exchanger in a cooling system connected to an engine in a motor vehicle. The motor vehicle includes an engine, a cooling circuit, a heat exchanger having at least a partially externally coating of a catalytic material for converting environmentally harmful substances in ambient air. A sensor determines the effectiveness of the catalytic exchanger by comparing a parameter on one side of the heat exchanger with a parameter on the other side of the heat exchanger. The sensor determines the effectiveness of the catalytic exchanger by measuring untreated air and air that is treated by passing through the heat exchanger. A fan is used to reverse the flow of air to and from the heat exchanger. The sensor can also determine the degradation of a test cell which degrades in a similar manner as the catalytic coating on the heat exchanger.

31 Claims, 4 Drawing Sheets

US 6,681,619 B2

SYSTEM FOR DETERMINING THE EFFECTIVENESS OF A CATALYTIC COATING ON A RADIATOR IN A MOTOR VEHICLE

CROSS REFERENCE TO RELATED APPLICATIONS

The present application claims priority to Swedish Application No. 0001766-5, filed May 10, 2000. The disclosure of that application is expressly incorporated herein in its entirety.

BACKGROUND OF INVENTION

Technical Field

This invention relates to a catalytic coating for use with a radiator in a motor vehicle, and more particularly, to a determining the effectiveness of a catalytic coating on a radiator in a motor vehicle.

Radiator assemblies for motor vehicles, where the radiator assembly is coated with a catalytic material for converting environmentally harmful substances in ambient air during the utilization of the motor vehicle, are well known. The purpose of this catalytic coating is to utilize the vehicle for improving the environment by cleaning ambient air.

In order for the catalytic coating to convert an environmentally harmful substance, the coating needs to achieves its working temperature. As a result of the radiator being heated by the cooling medium, a working temperature for the catalytic coating is provided without requiring any additional work from the engine since the radiator is designed to emit excess heat. Furthermore, the radiator is positioned to provide an extensive heat exchange with the environment. This is accomplished by placing the radiator in a position enabling a good through-flow of air. When the air flow is insufficient, a fan can provide the additional air flow sufficient for cooling the engine. This implies that large air quantities pass through the radiator, thereby enabling the catalytic coating to clean large quantities of air.

However, as a result of the exposed position of the radiator, it has been found that the catalytic function may degrade without the knowledge of to the driver of the vehicle. Moreover, the driver will not realize that the effectiveness of the catalytic coating has degraded from the behavior of the vehicle, since the catalytic function does not affect the performance of the vehicle.

SUMMARY OF INVENTION

One aspect of the invention is to provide a vehicle where by a driver or maintenance staff can be informed about the status of the catalytic function provided by the catalytic coating of a heat exchanger in a cooling system connected to an engine.

Another aspect of the invention is to determine the effectiveness of the catalytic coating of a heat exchanger in a cooling system connected to an engine using a control unit connecting to a sensor or detecting means. The detecting estimates the degree of conversion by the catalytic coating.

According to one aspect of the invention, the detecting means determines the effectiveness of the catalytic exchanger by comparing a parameter on one side of the heat exchanger with a parameter on the other side of the heat exchanger.

According to one aspect of the invention, the detecting means determines the effectiveness of the catalytic exchanger by measuring untreated air and air that is treated by passing through the heat exchanger.

According to one aspect of the invention, the detecting means determines the effectiveness of the catalytic exchanger by comparing air that passes through the heat exchanger with that which does not pass through the heat exchanger, where in a fan is able to reverse the flow of air to and from the heat exchanger.

According to one aspect of the invention, the detecting means uses a test cell mounted on the heat exchanger or similar position such that the test cell degrades comparably to the catalytic coating on the heat exchanger. A detecting means is used to determine the effectiveness of the catalytic material on the test cell.

DETAILED DESCRIPTION

Figure 1:
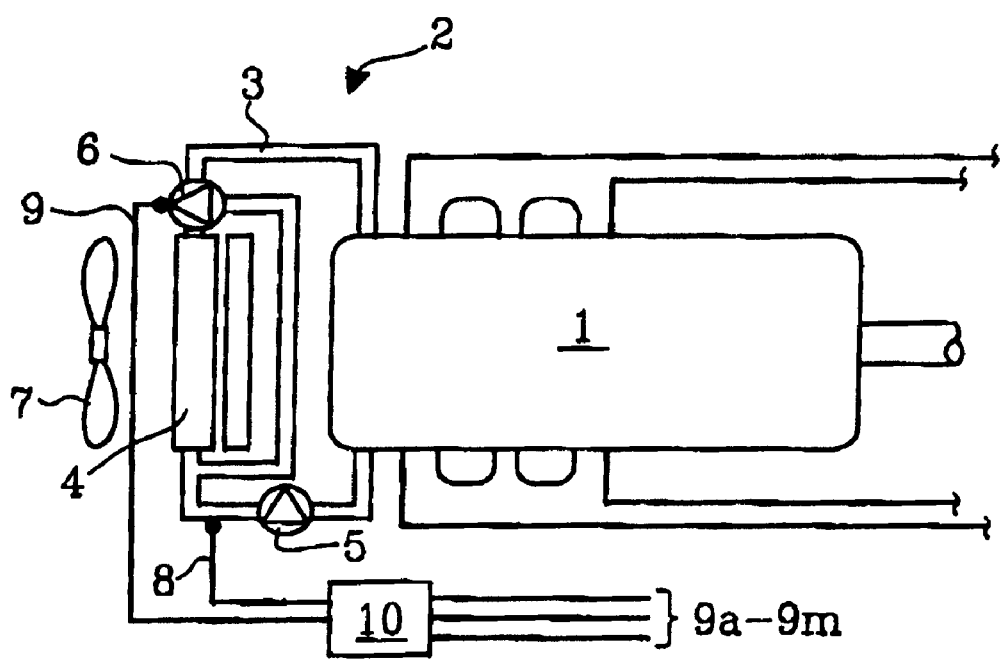
FIG. 1 is a schematic illustration of a combustion engine according to a first embodiment of the invention.

Referring to FIG. 1, a schematic of a combustion engine for a motor vehicle in accordance with a first embodiment of the present invention is illustrated. In a preferred embodiment of the invention, the engine is a conventional combustion engine. A cooling circuit 2 is fitted to the engine 1. The cooling circuit 2 is of a conventional type and comprises cooling channels 3, a heat exchanger 4, a coolant pump 5, and a thermostat valve 6. The cooling channels 3 are connected to cooling channels (not shown) in the engine 1. The heat exchanger 4 emits heat to the environment. The coolant pump 5 drives the coolant in the cooling circuit 2. The thermostat valve 6 opens and closes the flow of the coolant through the heat exchanger 4 and instead allows the coolant to by-pass the heat exchanger 4 into a parallel channel.

In ensure that the air flow through the heat exchanger 4 is sufficient, for example, when the vehicle slows down or standing still, a fan 7 connected to the heat exchanger 4 is utilized. The fan 7 can be driven in any way known to one skilled in the art, e.g., belt driven or chain driven from a power outlet coupled to the crankshaft or camshaft of the vehicle, or by an electric motor coupled to the fan 7.

In a preferred embodiment of the invention, the fan is reversible. In this case, the fan 7 is preferably driven by an electric motor. Alternatively, a gear between a driving belt or chain and the fan 7 may be utilized for mechanical driving.

The heat exchanger 4 is at least partially coated with a catalytic material. The catalytic material is designed to convert an environmentally harmful substance into one or more substances which are non-harmful to the environment. Examples of environmentally harmful substances include particles, ozone, carbon monoxide, nitrous oxide, VOC, HC, NMOG, NOx, SO2 and methane.

In a preferred embodiment of the invention, the catalytic material covers cooling flanges included in the heat exchanger 4, wherein the catalytic material is given a large surface which is exposed towards the environment.

In order to detect the degree of conversion of the heat exchanger 4, a sensor or detecting means 8, 9 is connected to a control unit 10. In one embodiment, additional sensors or detecting means 9a–9m or sets of sensors or detecting means 9a–9m are connected to the control unit 10. These sensors or detecting means 9a–9m measure parameters related to the vehicle and the environment such as temperature, oxygen storage, flow, pressure, pressure drop, heat conduction, weight, conductivity, resistance, adhesion, fouling, chemical composition, galvanic potential, fluorescence, reflectance, absorbance. Subsequently, one or more of the parameters is to determine the concentration of the environmentally harmful substances being converted by the catalytic material.

In another embodiment of the invention, the sensor 9 or set of sensors or detecting means 9a–9m are used to determine the concentration of the environmentally harmful substances being converted by the catalytic material. This determination is based on the sensor(s) 9, 9a–9m measuring the substance concentrations before passage through the radiator.

In an alternative embodiment of the invention, the sensor 9 or set of sensors or detecting means 9a–9m comprise a pressure sensor which gives a first output signal dependent on static pressure downstream from the heat exchanger 4 and thereby on the air flow through the heat exchanger 4, wherein the control unit 10 is configured to estimate a degree of conversion based on the first output signal.

In yet another alternative embodiment of the invention, the sensor 9 or set of detecting means 9a–9m comprise a differential pressure sensor which gives a first output signal dependent on the pressure drop across the heat exchanger 4 and thereby on the air flow through the heat exchanger 4, wherein the control unit 10 is configured to estimate a degree of conversion based on the first output signal.

In a further alternative embodiment of the invention, the sensor 9 or set of detecting means 9a–9m comprise a flow sensor which gives a first output signal dependent on the air flow through the heat exchanger 4, wherein the control unit 10 is configured to estimate a degree of conversion based on the first output signal.

The control unit 10 is of a type known in the art and therefore will not be described in any greater detail. In one embodiment, the control unit 10 is a microprocessor included in the engine control system. In another embodiment, the control unit 10 is a separate processor which is able to communicate with other processors in the vehicle via a bus.

In a first embodiment of the invention, the sensors or detecting means 8, 9 comprises a first temperature sensor configured to measure the temperature of the coolant. Since the catalytic material has to reach a predetermined temperature before conversion can take place, an initial approximation of the degree of conversion of the heat exchanger with the catalytic coating can be performed by measuring to determine if an ignition or predetermined temperature of the catalytic material has been reached.

In one embodiment of the invention, the detection does not start until the engine temperature is stabilized, for example, once the engine temperature reaches 90° C. Thereafter, the thermostat valve is opened completely, and the effect of the radiator is measured. The response contains the measurement of the cooling effect of the radiator without any influence from the thermostat valve.

Furthermore, the efficiency of the radiator, and thereby the degree of conversion can be estimated in an initial approximation by a simple surveillance of the temperature of the cooling system. When the temperature rises too much, this indicates that the capacity of the radiator has been reduced, and thereby also the degree of conversion has been reduced.

In a second embodiment of the invention, the detecting means 8, 9 further comprises a first and a second temperature sensor. In a further preferred embodiment, the first and second temperature sensors 8, 9 are mounted in the cooling circuit 2 with intermediate cooling channels in the heat exchanger 4. The control unit 10 is configured to estimate the heat emission of the heat exchanger 4 based on the difference between estimated temperatures of the first temperature sensor and of the second temperature sensor.

By measuring the temperature at two separate positions of the heat exchanger with intermediate cooling channels, it is possible to estimate the status of the heat exchanger and thereby to estimate the degree of conversion of the catalytic coating within the area. In case the heat exchanger has cooling channels which are blocked, e.g., as a result of channels being partially or entirely filled with air or being blocked in another way, or in case cooling channels have fallen off, which is not uncommon in older vehicles, the efficiency of the radiator will be reduced. This means that the reduction of the coolant temperature during the passage through the radiator will become smaller. Since no conversion will take place in those areas where channels have been blocked and the ignition temperature consequently is not reached, or in areas which have fallen off, the degree of conversion can be estimated from information on the coolant temperature reduction during the passage through the heat exchanger.

In a preferred embodiment of the invention, the first temperature sensor 8 is placed upstream from the heat exchanger 4 and the second temperature sensor 9 is placed downstream. In one embodiment of the invention, the first temperature sensor 8 includes a thermostat valve 6 in the cooling circuit, configured to open a passage via the heat exchanger when the coolant has reached its working temperature.

In an alternative embodiment of the invention, the temperature sensors 8, 9 are placed directly inside the heat exchanger material, in direct connection with flanges included in the heat exchanger 4.

Figure 2:
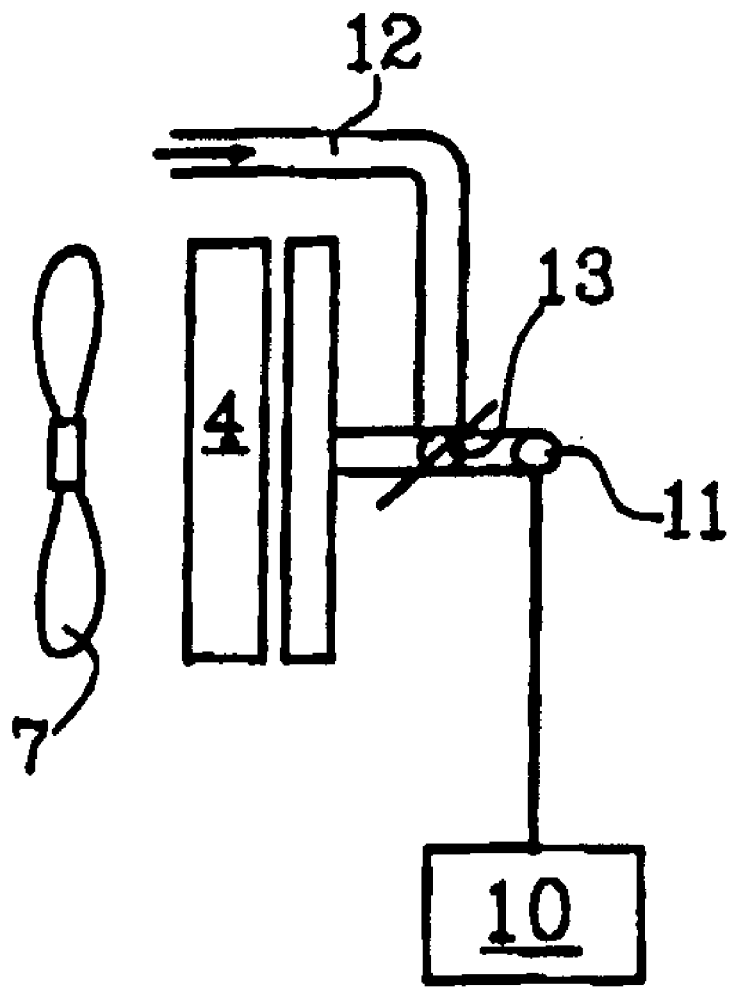
FIG. 2 is a schematic illustration of a combustion engine according to a second embodiment of the invention.

Referring to FIG. 2, a schematic of a combustion engine in accordance with a second embodiment of the present invention is illustrated. As illustrated, the detecting means comprises a first sensor 11 connected to the heat exchanger 4. The first sensor 11 is of the type known for detecting environmentally harmful substances, such as substances found in the ozone. In order to estimate the degree of conversion of the catalytic coating, a value measured for treated air has to be compared with a value for untreated air. In one embodiment of the invention, this value can be normative, e.g., a value stored in the control unit 10. In another embodiment of the invention, the comparison is based on a sensor which is subjected to treated air and a sensor which is subjected to untreated air. In a preferred embodiment of the invention, only a first sensor is utilized, wherein two alternative air routes are provided for reaching the sensor, partly a route with passage via the heat exchanger 4, and partly a route where passage does not take place. In order to accomplish this, in one embodiment, the motor vehicle is provided with an air channel 12, that has a channel that is partly arranged to direct air to the detecting means without passing the heat exchanger 4, and partly arranged to direct air to the detecting means via passage through the heat exchanger 4. An air valve 13, enabling passage from the selected inlet, is arranged in the air channel. Subsequently, a comparison of the output signal from these two measurement points can be utilized in order to estimate the degree of conversion of the catalytic coating on the heat exchanger 4.

Figure 3:
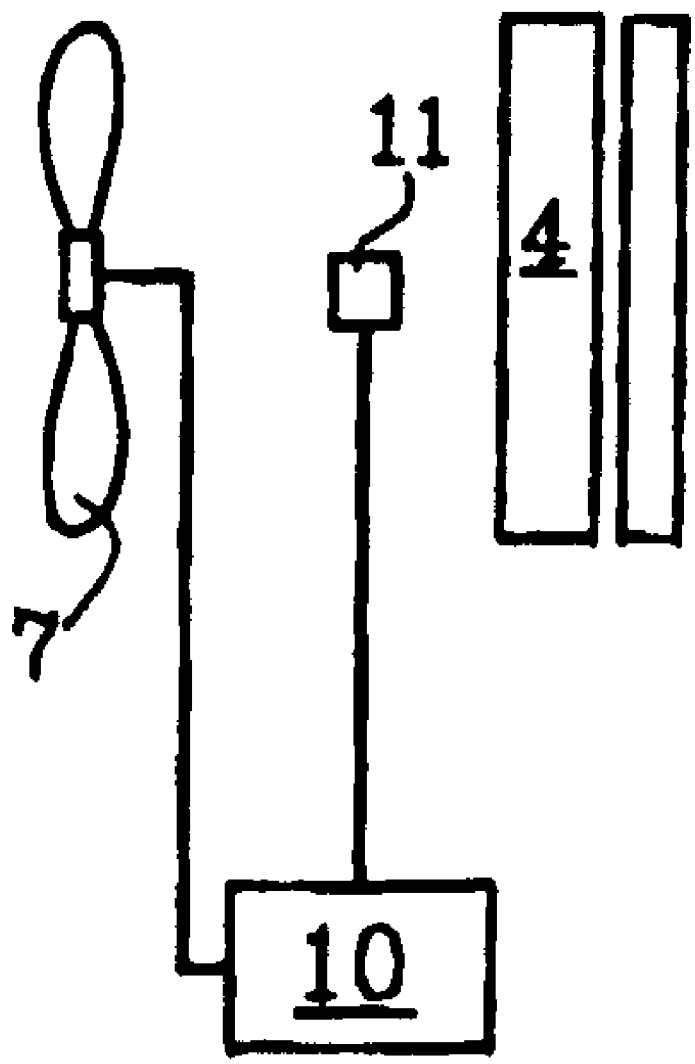
FIG. 3 is a schematic illustration of a combustion engine according to a third embodiment of the invention.

Referring to FIG. 3, a schematic of a combustion engine in accordance with a third embodiment of the present invention is illustrated. As illustrated, instead of the air channel 12, the direction of rotation of the fan 7 can be varied. In this case, a sensor 11 is used to measure the content of environmentally harmful substances in air that passes through the heat exchanger 4, and in air that has not passed through the heat exchanger 4. Accordingly, the sensor can be mounted upstream or downstream from the radiator, as viewed from the normal traveling direction of the vehicle, wherein a first measurement is performed with the fan operating in the normal direction and a second measurement is performed with the fan operating in reversed direction. In order to reverse the fan, the fan is preferably controlled by an electric motor. In alternate embodiments, the fan is conventionally driven e.g., belt or chain driven if a gear is arranged between the drive shaft from the engine and the fan.

In yet a further embodiment of the invention, the air inlet of the combustion engine is used instead of a fan to collect in part air flow that has passed through the radiator, and in part that which has not passed through the radiator. In this case, two air channels are fitted to the air inlet of the combustion engine, one having its inlet downstream from the radiator, and one having its inlet from an unaffected region. A sensor is mounted in the channel system driven by the air inlet of the combustion engine.

Since sensors as a rule are sensitive to the environment, the sensor is preferably mounted in a protected location, for example behind the radiator. In a preferred embodiment of the invention, the sensor is an ozone sensor.

In a further embodiment of the invention, the vehicle comprises a generator or means for generating one or more environmentally harmful substances, with the means being arranged to subject the heat exchanger to a predetermined concentration upstream from the heat exchanger 4 when determining the degree of conversion of the environmentally harmful substance, whereas the detecting means is configured to measure the concentration of the environmentally harmful substance downstream from the heat exchanger 4.

In those embodiments where only one sensor or detecting means is utilized, preferably a predetermined level of the environmentally harmful substance is produced by the generating means. In cases where sensors are placed both upstream and downstream from the heat exchanger 4, preferably the concentration of environmentally harmful substance is measured partly before passage through the heat exchanger 4, and partly after passage through the heat exchanger 4, with the determination of the degree of conversion taking place by means of comparing the measured values upstream and downstream from the heat exchanger 4.

In a preferred embodiment, the means for generating an environmentally harmful substance is an ozone generator, in which ozone is generated for example by means of discharges or by UV-light.

Figure 4:
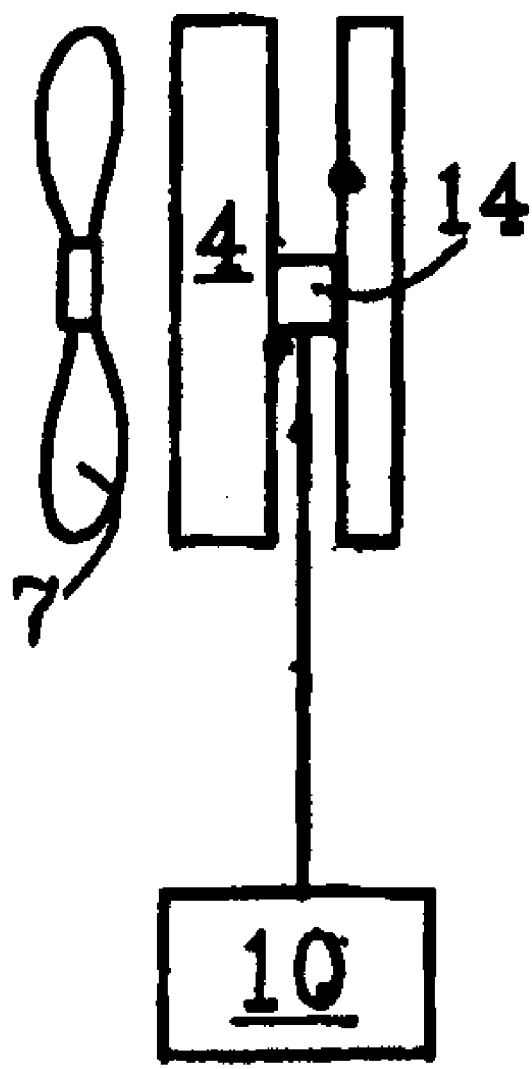
FIG. 4 is a schematic illustration of a combustion engine according to a fourth embodiment of the invention.

Referring to FIG. 4, a schematic of a combustion engine in accordance with a fourth embodiment of the present invention is illustrated. As illustrated, a set of detecting means or sensors 9, 9a–9n comprises a test cell 14, coated with a catalytic coating, mounted on the heat exchanger 4 or in a position which is equally exposed to the influence from the environment. Equally exposed means that a test cell placed in the equivalent position upon an average is degraded at the same rate as, or at a rate which exhibits a linear relationship to, a cell placed on the heat exchanger 4.

Accordingly, in one embodiment of the invention, the detecting means comprise a test cell coated with a catalytic coating exhibiting electrical or optical properties which change with wear and/or fouling, and where the control unit 10 is arranged to estimate the degree of conversion of the heat exchanger 4 with the catalytic coating from an output signal generated by the test cell.

In a preferred embodiment of the invention, the optical properties of the test cell change with loss of the catalytic material. This is accomplished by applying the catalytic material onto a transparent carrier and placing a light detector in connection with the test cell. When losing catalytic material, the transparency increases which enables detection of the degree of conversion. The transparent carrier preferably comprises a plastic having an adhesiveness to catalytic material which is similar to aluminum.

In one embodiment of the invention utilizing such a test cell, the electrical properties of the catalytic coating located on the test cell change with wear and/or fouling.

In a second embodiment of the invention utilizing such a test cell, the test cell carries an additional conductive layer on top of the catalytic coating, wherein the electrical properties of the additional conductive layer change with wear and/or fouling.

In a third embodiment of the invention utilizing such a test cell, the test cell carries an additional conductive layer on top of the catalytic coating, wherein the electrical properties of the additional conductive layer change with wear and/or fouling.

In a fourth embodiment of the invention utilizing such a test cell, the test cell carries one or more wires, the electrical properties of which change with wear and/or fouling, wherein the wires are designed to change in relation to the degradation of the catalytic coating. In a preferred embodiment of the fourth embodiment utilizing the test cell, the wires are designed in a way sensitive to corrosion and insulated so that the insulation falls off at the same rate as the catalytic coating degrades, wherein the wires corrode and their electrical properties change or the circuit is opened. In a further preferred embodiment, the wires are sensitive to corrosion and insulated so that the insulation falls off at the same rate as the catalytic coating degrades and their electrical properties are changed or the circuit is opened.

Furthermore, the test cell can be provided with a heater or means for heating the wires, wherein degradation of the catalytic material and thereby the degree of conversion is estimated by heating the wires with a current pulse. The cooling course is then studied by determining the thermal conductivity of the surface and thereby the correlating degradation of the catalytic coating.

As mentioned above, the test cell can be mounted on the heat exchanger 4 or in an equally exposed position, or alternatively, on a portion of the surface of the heat exchanger.

In the case when a change of the optical properties of the test cell is utilized, according to one embodiment, the test cell comprises a photocell mounted beneath a transparent carrier coated with a catalytic coating, wherein the test cell is arranged to generate an output signal dependent on the optical absorbance or reflectance of the test cell and thereby correlating with the degradation of the catalytic coating. Furthermore, according to a further embodiment, the test cell can comprise a second photocell mounted beneath a second transparent carrier without any catalytic coating, wherein the test cell is arranged to generate a second output signal dependent on the difference in absorbance or reflectance between the two transparent carriers, and wherein the second output signal is utilized in order to determine the degradation of the catalytic coating.

In order to ensure that the measurement of reflectance and absorbance takes place with a well defined light intensity, in one embodiment of the invention, the detecting means includes a light source illuminating the test cell when determining absorbance or reflectance, wherein a light intensity which is well-defined for the determination of absorbance or reflectance is obtained.

In a further embodiment of the invention utilizing a test cell, the optical properties of which change with degradation of the catalytic material, the detecting means comprise a photocell mounted in such a way that it is hit by light emitted via fluorescence or phosphorescence from the catalytic coating, wherein a first output signal is created dependent on the optical absorbance or reflectance of the test cell and thereby correlating with the degradation of the catalytic coating. In order to ensure that emitted light remains within a controlled range, the test cell is provided with a light source illuminating the test cell with light which results in light being emitted from the test cell which is measured by the photocell.

In a preferred embodiment, the detecting means includes a second photocell which is mounted in such a way that it is hit by light emitted from a surface which is not coated with fluorescent material wherein a second output signal is generated and utilized as a reference for the first output signal from the surface which is coated with a catalytic coating having fluorescence, wherein the ratio or difference between the first and second photocell is utilized in order to determine the degradation of the catalytic coating.

In order to ensure that the test cell estimates maximum deviation from optimum degree of conversion, the test cell preferably is mounted in an exposed position, for example directly behind the fan.

The invention is not limited to the above-described embodiments, but may be varied within the scope of the following claims.

What is claimed is:

1. A system in a motor vehicle for determining the effectiveness of a catalytic coating, the system comprising:
    an engine;
    a cooling circuit connected to the engine and having a recirculating fluid for cooling the engine, the cooling circuit further provided with a heat exchanger which is at least partially externally coated with a catalytic material, the recirculating fluid able to pass through the heat exchanger, wherein the catalytic material is able to convert environmentally harmful substances;
    a control unit; and
    a detecting means connected to said control unit, said detecting means for determining a degree of conversion of one or more environmentally harmful substances by the catalytic coating of the heat exchanger.

2. The system according to claim 1, wherein said control unit is configured to detect a concentration of said one or more environmentally harmful substances after conversion of the one or more environmentally harmful substances into substances which are not harmful to the environment.

3. The system according to claim 1, wherein said detecting means is configured to measure a concentration of the one or more environmentally harmful substances and determines the degree of conversion of the one or more environmentally harmful substances.

4. The system according to claim 1, wherein said detecting means comprises a first temperature sensor configured to provide a first output signal dependent on the temperature of coolant in the cooling circuit, and said control unit is configured to determine a degree of conversion based on said first output signal.

5. The system according to claim 4 further comprising a second temperature sensor connected to said cooling circuit, said first and second temperature sensors being mounted in the cooling circuit with intermediate cooling channels in the heat exchanger,
    wherein said control unit is configured to determine heat emission of the heat exchanger based on differences between determined temperatures of the first temperature sensor and of the second temperature sensor.

6. The system according to claim 5, wherein said control unit is configured to estimate the degree of conversion based on the difference between a determined temperature of the first temperature sensor and of the second temperature sensor.

7. The system according to claim 5, wherein said first temperature sensor and said second temperature sensor are placed upstream and downstream from the heat exchanger.

8. The system according to claim 5, said first temperature sensor further comprising a thermostat valve in the cooling circuit, said thermostat valve being configured to open and close the flow of the cooling circuit through the heat exchanger.

9. The system according to claim 5, wherein said second temperature sensor is mounted on the heat exchanger in connection with cooling flanges in the heat exchanger.

10. The system according to claim 1, said detecting means further comprising a first sensor configured to measure the content of the one or more environmentally harmful substances downstream from the heat exchanger.

11. The system according to claim 10, said motor vehicle further comprising means for deflecting the air flow passing through said heat exchanger, said first sensor being arranged to be exposed partly to a first air flow which has passed the heat exchanger wherein a third output signal is generated, and exposed partly to a second air flow which has not passed through the heat exchanger, wherein a fourth output signal is generated, wherein said control unit is configured to estimate the degree of conversion based on said third and fourth output signals.

12. The system according to claim 11, said deflecting means further comprising an air channel which directs air to by-pass through the heat exchanger.

13. The system according to claim 11, said deflecting means further comprising a means for reversing a fan, said fan being coupled with the heat exchanger,
    wherein said reversing means allows said first sensor to be exposed partly to a first air flow which has passed the heat exchanger, and partly to a second air flow which has not passed the heat exchanger.

14. The system according to claim 10, said detecting means further comprising a second sensor configured to measure content of the one or more environmentally harmful substances upstream from the heat exchanger, wherein said control unit is configured to determine the degree of conversion based on output signals from said first and second sensors.

15. The system according to claim 14, wherein said engine is a combustion engine having an air inlet, said second sensor being located in an air channel connected to said air via a valve inlet in way possible to close said valve.

16. The system according to claim 10, further comprising means for generating a predetermined concentration of one or more environmentally harmful substances, wherein said means are arranged to expose the heat exchanger to a predetermined concentration of the one or more environmentally harmful substances upstream from the heat exchanger when determining the degree of conversion of the one or more environmentally harmful substances, and wherein said detecting means is configured to measure the concentration of the one or more environmentally harmful substances downstream from the heat exchanger.

17. The system according to claim 1, said detecting means further comprising a pressure sensor providing a first output signal dependent on static pressure downstream from the heat exchanger and on the air flow through the heat exchanger, wherein said control unit is configured to determine a degree of conversion based on said first output signal.

18. The system according to claim 1, said detecting means further comprising a differential pressure sensor providing a first output signal dependent on a pressure drop across the heat exchanging unit and on the air flow through the heat exchanger, wherein said control unit is configured to determine a degree of conversion based on said first output signal.

19. The system according to claim 1, wherein said detecting means comprises a flow sensor providing a first output signal dependent on the air flow through the heat exchanger, wherein said control unit is configured to determine a degree of conversion based on said first output signal.

20. The system according to claim 7, wherein said detecting means comprises a test cell coated with a catalytic coating exhibiting electrical or optical properties which change with wear and/or fouling; and wherein said control unit is configured to determine the degree of conversion of the heat exchanger with the catalytic coating from an output signal generated by said test cell.

21. The system according to claim 20, said test cell further comprising one or more wires having electrical properties changing in relation to degradation of the catalytic coating.

22. The system according to claim 21, wherein said one or more wires are sensitive to corrosion and insulated, wherein insulation on the one or more wires falls off at the same rate as the catalytic coating degrades, and wherein the wires corrode changing the electrical properties of the wires or opening the circuit.

23. The system according to claim 21, said test cell further comprising means for heating the wires, wherein degradation of the catalytic material and the degree of conversion is estimated by means of heating the wires with a current pulse after which a cooling course is determined based on the thermal conductivity of a surface, thereby providing a correlating degradation of the catalytic coating.

24. The system according to claim 20, said test cell further comprising a photocell mounted beneath a transparent carrier coated with a catalytic coating, wherein said test cell is arranged to generate an output signal dependent on optical absorbance or reflectance of the test cell and thereby correlating with the degradation of the catalytic coating.

25. The system according to claim 24, said test cell further comprising a second photocell mounted beneath a second transparent carrier without catalytic coating, wherein said test cell is arranged to generate a second output signal dependent on differences in absorbance or reflectance between the two transparent carriers, wherein said second output signal is used in determining degradation of the catalytic coating.

26. The system according to claim 24, said detecting means further comprising a light source illuminating the test cell when determining absorbance or reflectance, wherein a light intensity which is well-defined for the determination of absorbance or reflectance is obtained.

27. The system according to claim 20, said detecting means further comprising a photocell mounted in such a way that said photocell receives light emitted via fluorescence or phosphorescence from the catalytic coating, wherein a first output signal is created dependent on an optical absorbance or reflectance of the test cell and thereby correlating with the degradation of the catalytic coating.

28. The system according to claim 27, said detecting means further comprising a light source illuminating the test cell, wherein emitted light from the catalytic coating is generated.

29. The system according to claim 27, said detecting means further comprising a second photocell which is mounted in such a way that said second photocell receives light emitted from a surface which is not coated with fluorescent material, wherein a second output signal is generated which is utilized as a reference for the first output signal from the surface which is coated with a catalytic coating having fluorescence, wherein the difference between light received in the first and second photocell is utilized in order to determine the degradation of the catalytic coating.

30. A motor vehicle system for determining the effectiveness of a catalytic coating, the motor vehicle system comprising:

an engine with a cooling circuit connected thereto, said cooling circuit having a heat exchanger that is at least externally coated with a catalytic material for conversion of environmentally harmful substances;

a control unit; and a sensor connected to said control unit, wherein said control unit is able to determine a degree of conversion of one or more environmentally harmful substances by said catalytic coating of said heat exchanger.

31. The system according to claim 1, wherein said control unit is configured to detect a concentration of said one or more environmentally harmful substances before conversion of the one or more environmentally harmful substances into substances which are not harmful to the environment.

* * * * *